United States Patent

Weininger et al.

[15] 3,673,127

[45] June 27, 1972

[54] ULTRAFINE POROUS POLYMER ARTICLE AND METHOD OF MAKING

[72] Inventors: Joseph L. Weininger; Fred F. Holub, both of Schenectady, N.Y.

[73] Assignee: General Electric Company

[22] Filed: Oct. 20, 1969

[21] Appl. No.: 867,925

[52] U.S. Cl. .................. 260/2.5 HA, 117/98, 260/2.5 R, 260/2.5 HB, 260/875, 260/878, 260/879, 260/884, 260/885, 260/886
[51] Int. Cl. ............................... C08f 47/08, C08f 29/12
[58] Field of Search .......... 117/98; 260/2.5 R, 2.5 M, 2.5 HA, 260/2.5 HB

[56] References Cited

UNITED STATES PATENTS

| | | | |
|---|---|---|---|
| 3,057,750 | 10/1962 | Bennett et al. | 117/98 F |
| 3,382,090 | 5/1968 | Meisel et al. | 117/47 |
| 3,297,595 | 1/1967 | Mindick et al. | 260/2.5 M |

Primary Examiner—Murray Tillman
Assistant Examiner—Wilbert J. Briggs, Sr.
Attorney—Richard P. Brainard, Paul A. Frank, Charles T. Watts, Paul R. Webb, II, Frank L. Neuhauser, Oscar B. Waddell and Joseph B. Forman

[57] ABSTRACT

Ultrafine porous polymer articles with a predetermined maximum pore radius and processes of producing such polymer articles are described wherein a thermoplastic polymer body is contacted with an aqueous solution of a selected monomer, a specified differential pressure is applied between opposite body sides, only the pores with a radius larger than the predetermined radius are wetted by the solution of the monomer, the solvent is evaporated, and the monomer is polymerized in situ. The resulting article is a composite structure consisting substantially of a first thermoplastic polymer, and a small addition of a second polymer in the former pores which were larger than the predetermined maximum pore radius.

2 Claims, No Drawings

ULTRAFINE POROUS POLYMER ARTICLE AND METHOD OF MAKING

This invention relates to a method of producing novel ultrafine porous polymer articles with a predetermined maximum pore radius and to the articles produced by this process. More particularly, this invention relates to a new method of making an ultrafine, porous polymer article with a predetermined maximum pore radius which comprises providing a porous thermoplastic polymer body of a monoethylenically unsaturated hydrocarbon, contacting the body with an aqueous solution of a monomer selected from the group consisting of neutral unsaturated monomers, unsaturated acids, unsaturated amines, and mixtures thereof, applying a differential pressure between opposite sides of the porous body thereby wetting with the solution of the monomer only pores with a radius larger than the predetermined maximum pore radius, selecting the differential pressure in accordance with the formula $$\Delta P = (2\gamma \cdot \cos \theta)/r$$

where $\Delta P$ is the differential pressure between opposite sides of the porous body, $\gamma$ is the surface tension of the monomer, $\theta$ is the wetting angle, and $r$ is the radius of the pore to be wetted; evaporating the solvents and polymerizing the monomer in situ resulting in an ultrafine porous polymer article with a predetermined maximum pore radius.

Porous structures have been made by selectively dissolving a soluble solid material from a heterogeneous mixture of the soluble solid, e.g., sodium chloride, urea, sodium carbonate, sodium bicarbonate, etc., and a polymer. The above materials do not provide ultrafine porous structures. The polymer has to be in sufficient quantity that a connecting network of polymer is formed so that the structure does not disintegrate when the soluble material is extracted. On extraction of the soluble solid, non-uniform large size pores are obtained because of the failure to obtain a uniform blend during the mixing operation and unfilled voids which are trapped during the milling and sheeting operation.

Another method of making porous products is to incorporate a thermally decomposable material into a polymer followed by heating to cause decomposition of the thermally decomposable material and expansion of the polymer into a porous structure. Such a process requires careful compounding of the composition to avoid premature decomposition, as well as careful control of the amount of material placed in the vessel in which it is to be formed, such as a mold, so that just enough material is added to completely fill and shape the formed, porous article. Furthermore, thermally decomposable materials are generally dangerous to handle and relatively expensive, and generally used to form closed pores.

Other methods have also been used, e.g., volatilization of a solvent, use of an extractable plasticizer, sintering, bonding with an adhesive, etc., but these methods also fail to give the very uniform, ultrafine porous structure with a predetermined maximum pore radius that we obtain by our process.

We have now found a method for making ultrafine, porous polymer articles with predetermined maximum pore radii which essentially eliminates all of the drawbacks of the prior art processes. In practicing our invention, any porous thermoplastic polymer body of a mono-ethylenically unsaturated hydrocarbon may be used, examples of which are the various polymers and copolymers produced initially by the polymerization of mono-ethylenically unsaturated hydrocarbons which may be substituted with aryl substituents, for example, phenyl, tolyl, dimethylphenyl, naphthyl, etc. Preferably, the mono-ethylenically unsaturated hydrocarbon has from two to eight carbon atoms in the unbranched part of the olefinic chain and preferably the ethylenic unsaturation is between the terminal and its adjacent carbon atom, i.e.,

$$CH_2 = C<$$

Such unsaturated hydrocarbons are known as 1-alkenes or alphaolefins.

Specific examples are the polymers and copolymers of two or more of the following mono-ethylenically unsaturated hydrocarbons: ethylene, propylene, 1-butylene, 1-isobutylene, 4-methyl-1-pentene, 4-ethyl-1-hexene, 1-octene, 1-hexene, styrene, vinyl toluene, vinylnaphthalene, etc. The preferred polymers are the polymers of alkenes included in the scope of a $C_{2-8}$ alkene-1, and especially, polymers of ethylene and polymers of propylene. Mixtures which are blends of two or more of these polymers, rather than copolymers, likewise may be used, or a blend of polyphenylene oxide and polystyrene.

Also, various amounts of polymerizable monomers other than mono-ethylenically unsaturated hydrocarbons, e.g., 1,3-butadiene, 2,4-dimethyl-1,3-butadiene, 1,4-hexadiene, isoprene, acrylic acid and its esters, methacrylic acid and its esters, vinyl esters, vinyl ethers, vinyl chloride, vinyl pyridine, vinyl quinoline, etc., may be copolymerized with the mono-ethylenically unsaturated hydrocarbons or the polymers of the former may be mixed with the polymers of the latter. In choosing any of the copolymers or mixed polymers, it will be readily apparent that either the properties or the quantity of the other monomer incorporated into the copolymer or the other polymer mixed with the polymer of the mono-ethylenically unsaturated hydrocarbon should not so greatly decrease the rigidity, i.e., cold-flow properties, of the resulting porous body that it would be unsatisfactory for making ultrafine porous articles in accordance with our process. In other words, the properties of the porous body should more nearly resemble the properties of the polymers and copolymers of the mono-ethylenically unsaturated hydrocarbon. Such compositions are properly included in the term: polymers of a mono-ethylenically unsaturated hydrocarbon.

Our method can be used with a wide variety of thermoplastic polymer bodies made of the above material which are subsequently formed into porous polymers or polymer bodies. One method of forming such porous bodies is in accordance with U.S. Letters Patent No. 3,378,507 issued on April 16, 1968 in the names of Donald E. Sargent and Moyer M. Safford entitled "Producing Microporous Polymers." This patent is assigned to the same assignee as the present application.

In the above patent, microporous polymers of mono-ethylenically unsaturated hydrocarbon are made by heating a mixture of the polymer and a water-soluble, anionic surfactant to a temperature where a homogeneous solution of the two components is obtained and thereafter cooling the composition to a temperature where the surfactant and polymer form two intermingled separate phases and thereafter dissolving the surfactant phase from the polymer. These compositions have a fibrillous structure having extremely fine pores. Such materials are useful as filters, filter media, or as binding compositions for ion-exchange resins.

Other prior art porous polymer materials which have been rendered porous by the initial addition of and subsequent removal of materials such as sodium carbonate and sodium chloride, produced porous polymers with coarse pore sizes with an average range of 1 to 10 microns. The above porous polymer bodies can be cross-linked by high energy electron irradiation prior to or subsequent to dissolving or removing the leachable material therefrom to result in an insoluble, cross-linked structure.

High energy electron irradiation is set forth as a total dose which is defined as the total number of roentgen units applied in the irradiation operation. A roentgen unit, as usually defined, is the amount of irradiation that produces on electrostatic unit of charge per cubic centimeter of air under standard temperature and pressure conditions, and as employed here, refers to the amount of electron irradiation measured with an air-equivalent ionization chamber at the position of the surface of the polymer. While the total dose may be varied, we prefer to employ a total dose of $20 \times 10^6$ roentgen units at room temperature. A further discussion of high energy electron irradiation and suitable apparatus employed therefor is described, for example, in U.S. Pat. No. 2,763,609 issued Sept. 18, 1956, and U.S. Pat. No. 2,858,259 issued Oct. 28, 1958, both of which patents are assigned to the same assignee as the present application.

We found unexpectedly that we can make an ultrafine, porous polymer article with a predetermined maximum pore radius which comprises providing a porous thermoplastic polymer body as described above of a mono-ethylenically unsaturated hydrocarbon, contacting the body with a solution of a monomer selected from the group consisting of neutral unsaturated monomers, unsaturated acids, unsaturated amines, and mixtures thereof, applying a differential pressure between opposite sides of the porous body, thereby wetting with the monomer only pores with a radius larger than the predetermined maximum pore radius, selecting the differential pressure in accordance with the formula $$\Delta P = (2\gamma \cdot \cos \theta)/r$$

where $\Delta P$ is the differential pressure between opposite sides of the porous body, $\gamma$ is the surface tension of the monomer, $\theta$ is the wetting angle, and $r$ is the radius of the pore to the wetted; evaporating the solvent, and polymerizing the monomer in situ.

We found that we could contact the initial porous thermoplastic body with a liquid or solid monomer selected from the group consisting of neutral unsaturated monomers, unsaturated acids, unsaturated amines, and mixtures thereof which monomer could subsequently be polymerized in situ in pores drawing at least a predetermined maximum radius. Neutral monomers include isopropyl acrylamide, methacryl amide, methyl methacrylate, hydroxy-ethyl metacrylate, hydroxypropyl methacrylate, etc. Unsaturated acids in clude acrylic acid, methacrylic acid, 4 allyl phtalic acid, etc. Unsaturated amines include vinyl pyridine, vinyl quinoline, dimethalamino-methacrylate, t-butylamino methacrylate, and the quarternized derivatives of the tertiary amines, etc.

Such a monomer solution contacts the porous body by the application of a differential pressure between opposite sides of the porous body whereby the monomer is forced through the pores of the body. The monomer solution wets only the pore walls of pores having at least a pore radius which is greater than the predetermined pore radius. When a monomer solution is employed, it may be desirable to repeat once or more the contact of the monomer solution with the porous body, since the liquid is subjected to evaporation.

The differential pressure is selected in accordance with the formula $$\Delta P = (2\gamma \cos \theta)/r$$

where $\Delta P$ is the differential pressure between opposite sides of the porous body, $\gamma$ is the surface tension of the monomer, $\theta$ is the wetting angle, and $r$ is the radius of the pore to be wetted.

In Table I below, there is set below the differential pressure in atmospheres required for filling pore radii of 100, 200, 500 and 1000 Angstroms when specific monomers are employed in the practice of our invention. Specific monomers and the concentrations of the respective solutes in aqueous solutions are listed. The surface tension of the monomer solution and the contact or wetting angles are included.

TABLE I

| | Monomer Solute | Pore Radii—Angstroms 100A 200A 500A 1000A Differential Pressure ($\Delta P$) in Atmospheres | | | |
|---|---|---|---|---|---|
| 1 | 1 M allyl amine | 31.6 | 15.8 | 6.3 | 3.2 |
| 2 | 2 M allyl amine | 39.6 | 19.8 | 7.9 | 3.9 |
| 3 | 3 M allyl amine | 47.4 | 23.7 | 9.5 | 4.7 |
| 4 | 1 M acrylic acid | 17.4 | 8.7 | 3.5 | 1.7 |
| 5 | 1.5 M acrylic acid | 26.0 | 13.0 | 5.2 | 2.6 |
| 6 | 2 M acrylic acid | 46.0 | 23.0 | 9.2 | 4.6 |
| 7 | 1.35 M isopropyl acrylamide | 47.8 | 23.9 | 9.6 | 4.8 |

| | Surface Tension ($\gamma$) dyne/cm | Contact Angle ($\theta$) Degrees |
|---|---|---|
| 1 | 52.4 | 72.5 |
| 2 | 45.1 | 64. |
| 3 | 39.3 | 53. |
| 4 | 50.1 | 80. |
| 5 | 47.1 | 74. |
| 6 | 42.3 | 57. |
| 7 | 36.3 | 49. |

For use in the practice of our invention, a plurality of porous thermoplastic polymer bodies of polyethylene were provided. Each body was in the form of a membrane or sheet of about 4 mils thickness. The average properties of these bodies were as follows:

| Porosity | : | $50 \pm 2\%$ |
| Weight | : | $97 \pm 4$ milligrams |

Nitrogen flow through Membrane at:

| 5.3 psi : | $5.1 \pm 1.4$ ml/min/cm$^2$ |
| 65.3 psi : | $20.7 \pm 4.4$ ml/min/cm$^2$ |

Conductivity in
1 N aqueous KCl
Solution : $3.3 \pm 0.3$ millimho/cm.

Porosity of the polymer material is readily obtained by determining the difference in density between the initial impervious polymer and the porous polymer divided by the density of the initial impervious polymer multiplied by 100.

Gas flow measurements were made by flowing nitrogen gas at 20 pounds and at 80 pounds per square inch gauge through a test fixture which exposed 13.5 square centimeters of the porous polymer material. This gave a measure of gas permeability in terms of milliliters of gas passing though the material per minute per square centimeter of surface area.

A porous polymer, which has both high porosity and a high gas flow, is a structure with many large pores but which is not an ultrafine porous structure. A polymer, which shows low porosity and a low gas flow, is a structure which has very few pores which are neither continuous nor interconnected. High porosity of about 50 percent or greater, the above types of low gas flow rates, and relatively high conductivity discloses that the porous polymer article has a porous structure with generally uniformly distributed continuous and interconnecting pores which provides a structure with a controlled pore size or a predetermined maximum pore radius.

If a membrane as described above is brought up to a high pressure of 68 atmospheres many of the fine pores will be crushed, resulting in smaller porosity, permeability, and conductivity on returning the membrane to atmospheric pressure. As discussed above this can be avoided by cross-linking and strengthening the polyolefin by irradiation before processing. The radical source used to polymerize these monomers may in addition to electrons by $\gamma$ rays, u.v. rays, peroxides such as methyl ethyl ketone peroxide, coupled with metal activators soluble azo compounds, persulfates, etc.

The effect of such irradiation is shown below in Table II where three such porous polymer membrane of the above-described type are set forth with porosity percent and weight in milligrams before and after irradiation, maximum pressure before application of a differential pressure, and nitrogen flow rate subsequent to the differential pressure application.

TABLE II

| Example No. | Before Irradiation | | After | |
|---|---|---|---|---|
| | Porosity % | Wt. mg. | Porosity % | Wt. mg. |
| 1 | 51 | 97.2 | — | — |
| 2 | 51 | 93.1 | — | — |
| 3 | 49 | 93.5 | 49 | 93.8 |

| Example No. | Nitrogen Flow at 5.3 psi. 65.3 psi. ml/min/cm² | | Maximum Pressure Applied psi |
|---|---|---|---|
| 1 | 5.2 | 25.1 | 80 |
| 2 | 4.7 | 19.6 | 1000 |
| 3 | 5.3 | 24.0 | 1000 |

Membrane 1 and 2 in above Table II were not irradiated prior to the application of maximum pressure. The smaller flow rate for Example 2 resulting from the application of 1,000 psi is shown at 65.3 psi as compared to Example 1. However, Example 3 was irradiated prior to the application of maximum pressure. A high flow rate is exhibited by Example 3 as compared with Example 2 because Example 3 has been irradiated before exposure to 1,000 psi pressure.

In order that those skilled in the art may more readily understand our invention the following examples are given by way of illustration and not by way of limitation.

EXAMPLE 1

In this Example a membrane of the type described above was employed which was 4 mils thick. This membrane, identified as membrane No. 4, had a porosity of 51 percent, a weight of 96.6 milligrams and had a nitrogen gas flow of 5.0 milliliters per minute per square centimeter at 5.3 psi and 23.8 milliliters per minute at 65.3 psi. The conductivity, whose measurement is described above, was 3.1 millimho/cm. This membrane was not initially irradiated.

EXAMPLE 2

In this Example a membrane of the type described above was employed which was 4 mils thick. This membrane, identified as membrane No. 5, had a porosity of 50 percent, a weight of 95.8 milligrams and had a nitrogen gas flow of 5.8 milliliters per minute per square centimeter at 5.3 psi and 27.2 milliliters per minute per square centimeter at 65.3 psi. The conductivity, whose measurement is described above, was 3.1 millimho/cm. This membrane was not initially irradiated.

EXAMPLE 3

In this Example another membrane, which is designated as membrane No. 6, was employed. This membrane was initially irradiated and was subjected to our method to provide an ultrafine porous polymer article with a predetermined maximum pore radius. This membrane had a porosity of 51 percent, and a weight of 96.6 milligrams. This membrane was subjected to nitrogen gas flow at differential pressures of 5.3 psi and at 65.3 psi. The membrane had a gas flow of 5.1 milliliters per minute per square centimeter at 5.3 psi, and 23.8 milliliters per minute per square centimeter at 65.3 psi.

The membrane was contacted with 1.35 M isopropyl acrylamide as the monomer. A differential pressure of 68 atmosphere was applied between opposite sides of the porous body thereby wetting with the monomer solution only pores with a radius larger than the predetermined maximum pore radius of 70 Angstroms. The membrane which was impregnated with the monomer was then cross-linked at 20 Mr irradiation thereby polymerizing the monomer in situ resulting in an ultrafine porous polymer article with a second polymer filling pores with a radius larger than 70 Angstroms.

Subsequently this membrane was subjected again to nitrogen gas flows at the same initial differential pressures. The gas flow at 5.3 psi was 0.60 ml/min/cm² while the gas flow at 65.3 psi was 3.73 ml/min/cm². The conductivity was 0.86 millimho/cm. The decrease in flow at 5.3 psi was 87 percent while the decrease in flow at 65.3 psi was 84 percent.

Thus it will be seen from the decrease in nitrogen gas flow the effectiveness of applicant's method of closing larger pores in a porous structure thereby providing such a structure with a predetermined maximum pore radius.

EXAMPLE 4

In this Example another membrane, which is designated as membrane No. 7, was employed. This membrane was initially irradiated and was subjected to our method to provide an ultrafine porous polymer article with a predetermined maximum pore radius. This membrane had a porosity of 51 percent, and a weight of 97.1 milligrams. This membrane was subjected to nitrogen gas flow at differential pressures of 5.3 psi and at 65.3 psi. The membrane had a gas flow of 5.9 milliliters per minute per square centimeter at 5.3 psi, and 25.1 milliliters per minute per square centimeter at 65.3 psi.

The membrane was contacted with 3 M allylamine as the monomer solution. A differential pressure of 34 atmosphere was applied between opposite sides of the porous body thereby wetting with the monomer solution only pores with a radius larger than the predetermined maximum pore radius of 139 Angstroms. The membrane which was impregnated with the monomer was then cross-linked at 20 Mr irradiation thereby polymerizing the monomer in situ resulting in an ultrafine porous polymer article with a second polymer filling pores with a radius larger than 139 Angstroms.

Subsequently this membrane was subjected again to nitrogen gas flows at the same initial differential pressures. The gas flow at 5.3 psi was 3.8 ml/min/cm² while the gas flow at 65.3 psi was 21.1 ml/min/cm². The conductivity was 3.01 millimho/cm. The decrease in flow at 5.3 psi was 35 percent while the decrease in flow at 65.3 psi was 16 percent.

EXAMPLE 5

In this Example another membrane, which is designated as membrane No. 8, was employed. This membrane was initially irradiated and was subjected to our method to provide an ultrafine porous polymer article with a predetermined maximum pore radius. This membrane had a porosity of 51 percent, and a weight of 97.3 milligrams. This membrane was subjected to nitrogen gas flow at differential pressures of 5.3 psi and at 65.3 psi. The membrane had a gas flow of 5.9 milliliters per minute per square centimeter at 5.3 psi, and 25.7 milliliters per minute per square centimeter at 65.3 psi.

The membrane was contacted with 2 M acrylic acid as the monomer solution. A differential pressure of 34 atmosphere was applied between opposite sides of the porous body thereby wetting with the monomer solution only pores with a radius larger than the predetermined maximum pore radius of 135 Angstroms. The membrane which was impregnated with the monomer was then cross-linked at 20 Mr irradiation thereby polymerizing the monomer in situ resulting in an ultrafine porous polymer article with a second polymer filling pores with a radius larger than 135 Angstroms.

Subsequently this membrane was subjected again to nitrogen gas flows at the same initial differential pressures. The gas flow at 5.3 psi was 4.4 ml/min/cm² while the gas flow at 65.3 psi was 23.7 ml/min/cm². The conductivity was 3.38 millimho/cm. The decrease in flow at 5.3 psi was 15 percent while the decrease in flow at 65.3 psi was 8 percent.

EXAMPLE 6

In this example another membrane, which is designated as membrane No. 9 was employed. This membrane was initially irradiated and was subjected to our method to provide an ultrafine porous polymer article with a predetermined maximum pore radius. This membrane had a porosity of 51 percent, and a weight of 99.4 milligrams. This membrane was subjected to nitrogen gas flow at differential pressures of 5.3 psi and at 65.3 psi. The membrane had a gas flow of 5.6 milliliters per minute per square centimeter at 5.3 psi, and 24.9 milliliters per minute per square centimeter at 65.3 psi.

The membrane was contacted with 2 M acrylic acid as the monomer solution. A differential pressure of 68 atmosphere was applied between opposite sides of the porous body thereby wetting with the monomer solution only pores with a radius larger than the predetermined maximum pore radius of 68 Angstroms. The membrane which was impregnated with the monomer was then cross-linked at 20 Mr irradiation thereby polymerizing the monomer in situ resulting in an ultrafine porous polymer article with a second polymer filling pores with a radius larger than 68 Angstroms.

Subsequently this membrane was subjected again to nitrogen gas flows at the same initial differential pressures. The gas flow at 5.3 psi was 4.5 ml/min/cm$^2$ while the gas flow at 65.3 psi was 19.6 ml/min/cm$^2$. The conductivity was 2.78 millimho/cm. The decrease in flow at 5.3 psi was 31 percent while the decrease in flow at 65.3 psi was 19 percent.

Thus it will be seen from the decease in nitrogen gas flow that the effectiveness of applicant's method of closing larger pores in a porous structure thereby providing such a structure with a predetermined maximum pore radius without eliminating through pores with smaller diameters.

The above examples show that the type of ultrafine porous polymers obtained by our method are unique. Because of their controlled porosity and physical and chemical properties, the ultrafine porous polymers of this invention have many and varied uses. For example, they can be used to make molded articles of any desired shape either alone or mixed with various fillers, such as wood flour, diatomaceous earth, clay, carbon black, silica, fibrous materials such as glass fibers, asbestos fibers, cotton fibers, etc., to make sealed molded parts which are buoyant and will float in water, to make filters or filter media for use in process equipment to clarify solutions, to make cigaret filters, etc., or can be used as a matrix to absorb liquids such as dye solutions, inks, etc., to serve as a reservoir for example as in the making of a stamp pad, etc.

These polymers can be used to laminate, coat or impregnate one or more surfaces of a substrate material, for example, non-woven fabric, or other fibrous material, etc., or a solid surface, for example, metal sheets, wood, etc., or can be used to extrude a coating over another material, for example, wire, threads, tubes, etc., to leave an ultrafine porous coating on these articles which is excellent thermal insulation. Sheets or blocks of the ultrafine porous plastic may likewise be used to thermally insulate other objects such as pipe, refrigerators, etc. Sheets and laminates make ideal battery separators.

Metal powders, conductive solids, e.g., conductive carbons, metallized non-conductors, etc., may be incorporated into the polymer to make an ultrafine porous conductive article, e.g., sheets, which are suitable for electrodes in electromotive cells, e.g., fuel cells, decorative articles, electrical conductors, etc. Such structure would be ideally suited for such applications as, for example, water-treatment, the making of a solid electrolyte for low temperature fuel cells.

Obviously, other modifications and variations of the present invention are possible in light of the above teachings. It is therefore to be understood that changes may be made in the particular embodiments of the invention described which are within the full intended scope of the invention as defined by the appended claims.

What we claim as new and desire to secure by Letters Patent of the United States is:

1. A method of making an ultrafine, porous polymer article with a predetermined maximum pore radius which comprises providing a porous thermoplastic polymer body of a monoethylenically unsaturated hydrocarbon, contacting the body with a solution of a monomer selected from the group consisting of neutral unsaturated monomers, unsaturated acids, unsaturated amines, and mixtures thereof, applying a differential pressure between opposite sides of the porous body thereby wetting with the monomer solution only pores with a radius larger than the predetermined maximum pore radius, selecting the differential pressure in accordance with the formula $$\Delta P = (2\gamma \cos \theta / r)$$

where $\Delta P$ is the differential pressure between opposite sides of the porous body, $\gamma$ is the surface tension of the monomer solution, $\theta$ is the wetting angle, and $r$ is the radius of the pore to the wetted; evaporating the solvent, and polymerizing the monomer in situ.

2. A method as in claim 1, in which the polymer body has been cross-linked.

* * * * *